United States Patent [19]

Johnson

[11] Patent Number: 5,524,951

[45] Date of Patent: Jun. 11, 1996

[54] CARGO BOX INSTALLED INTEGRAL WITH PICKUP CAB TO AFFORD DIRECT ACCESS BETWEEN CAB AND BOX

[76] Inventor: Thurman Johnson, Rte. 1, Box 10, Harrisonville, Mo. 64701

[21] Appl. No.: 517,789

[22] Filed: Aug. 22, 1995

[51] Int. Cl.$^6$ ................................................. B60R 5/00
[52] U.S. Cl. .................... 296/37.6; 296/37.16; 296/183; 296/190; 224/402; 224/404
[58] Field of Search ................... 296/37.6, 37.8, 296/37.16, 37.1, 183, 190; 224/402, 403, 404

[56] References Cited

U.S. PATENT DOCUMENTS

| 2,530,097 | 1/1950 | Troth | 296/183 |
|---|---|---|---|
| 4,750,773 | 6/1988 | Chapline et al. | |
| 4,848,832 | 7/1989 | Starnes | 296/190 |
| 4,892,346 | 1/1990 | Berlin | 296/37.6 |
| 4,917,430 | 4/1990 | Lawrence | 296/37.6 |
| 4,941,702 | 7/1990 | Southward | 296/37.6 |
| 5,121,306 | 6/1992 | Palmisano | |
| 5,263,757 | 11/1993 | Reed | 296/37.6 |
| 5,316,358 | 5/1994 | Payne et al. | 296/37.6 |
| 5,439,150 | 8/1995 | Trahms | 224/404 |

FOREIGN PATENT DOCUMENTS 26682 2/1983 Japan ......................................... 296/190

*Primary Examiner*—Gary C. Hoge
*Attorney, Agent, or Firm*—Kokjer, Kircher, Bowman & Johnson

[57] ABSTRACT

A cargo box is provided that is installed between the bed and cap of a pickup. The cargo box includes a lid, sides, and a back panel, with the lid being hingably mounted to the cab. The cargo box extends laterally across the width of the bed and forms a sealed chamber to isolate its contents from the environment. The rear side of the cargo box and the front side of the bed include aligned openings therethrough to receive long items. The front of the box includes an opening to allow an individual within the cab access to the contents of the box.

4 Claims, 1 Drawing Sheet

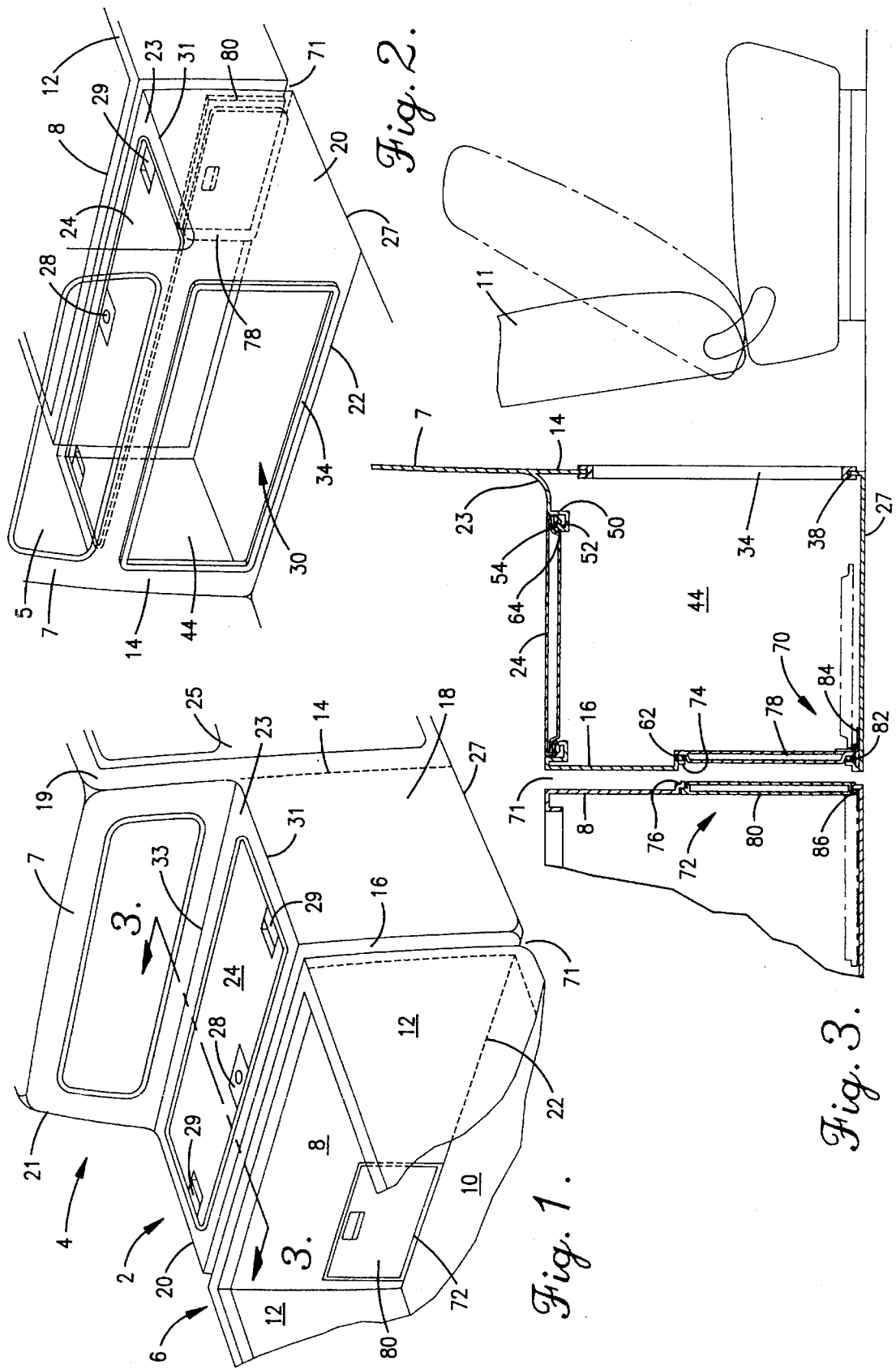

5,524,951

CARGO BOX INSTALLED INTEGRAL WITH PICKUP CAB TO AFFORD DIRECT ACCESS BETWEEN CAB AND BOX

BACKGROUND OF THE INVENTION

1. Field of the Invention

The invention generally relates to a cargo box formed integrally with the cab of a pickup for storing items, such as tools, groceries, a spare tire, and the like. More specifically, the invention relates to a cargo box located between the cab and bed which affords direct access to the interior of the box from the cab of the pickup.

2. Description of the Related Art

Cargo boxes have been proposed in the past for use in pickup beds, such as disclosed in U.S. Pat. No. 4,750,773 (Chapline et al.) and U.S. Pat. No. 5,121,306 (Palmisano).

The patent to Chapline et al. discloses a foldable box or cabinet for a truck bed which includes a top panel hinged to a rear wall. A front panel is hinged to the floor. The front and top panels combine to form the cargo box.

The patent to Palmisano discloses a tool compartment assembly for mounting in a pickup which includes a base portion and a cover. The assembly includes side flanges which are mounted to the top end of side panels in order to mount the compartment to the truck. The upper and lower surfaces of the side flanges include resilient seals to protect the truck's finish and to provide a cushioned, watertight seal between the base portion and the cover. An upper resilient seal is attached to an under surface of the cover to engage a flanged lip of the base when the cover is closed thereby sealing the interior compartment. A locking mechanism includes a pair of transverse extension rods movably connected to an interior surface of the front wall of the base to be laterally moved between locked and unlocked positions. A shaft extends from the rods into a rear portion of the cabin, thereby permitting manipulation of the rods from within the cabin by rotating a handle attached thereto. In this manner, the cover can be locked from within the cabin to increase security.

However, neither Chapline nor Palmisano provide access through the front end of the cargo box to the interior thereof directly from the cab. Thus, when a user desires to store or retrieve items to and from the box, the user must open the lid. If the user opens the lid to the cargo box, the items within the box are exposed to adverse whether conditions, such as when it rains. Further, when a user stores items in the cargo boxes of Chapline and Palmisano, the user is only able to access such items from outside of the pickup. Hence, during travel, the vehicle must be stopped in order for the driver to open the lid to retrieve items such as food and the like.

Accordingly, a need remains within the industry to provide a storage compartment within a pickup which protects items from the weather without taking up cab space and which allows occupants of the cab direct access to items within the compartment from the pickup cab.

SUMMARY OF THE INVENTION

It is an object of the present invention to provide a cargo box formed integrally within the cab of a pickup which provides a sealed environment to protect items therein from the elements.

It is a further object of the present invention to provide a sealed compartment which may be directly accessed from the cab of the pickup while being maintained in a secured, closed snare.

It is a corollary object of the present invention to provide a longer panel door between the pickup bed and the cargo box to allow items, such as lumber, to be slid into the cargo box to fit in the bed.

A cargo box is provided that is installed between the bed and cab of a pickup. The cargo box includes a lid, sides, and a back panel, with the lid being hingably mounted to the cab. The cargo box extends laterally across the width of the bed and forms a sealed chamber to isolate its contents from the environment. The rear side of the cargo box and the front side of the bed include aligned openings therethrough to receive long items. The front of the box includes an opening to allow an individual within the cab access to the contents of the box.

BRIEF DESCRIPTION OF THE DRAWINGS

The objects and features of the invention noted above are explained in more detail with reference to the drawings, in which like reference numerals denote like elements, and in which:

FIG. 1 illustrates a rear perspective view of a cargo box according to the present invention;

FIG. 2 illustrates a front perspective view of a cargo box according to the present invention containing an access panel to the cab of the pickup; and FIG. 3 illustrates a side sectional view of a cargo box according to the present invention taken along line 3—3 in FIG. 1.

DETAILED DESCRIPTION OF THE INVENTION

FIG. 1 illustrates a cargo box 2 mounted with the cab 4 of a pickup in front of the bed 6. The pickup bed 6 includes a front wall 8, a floor 10, and side walls 12. The cargo box 2 is located at the forward end of the bed and formed integrally with the cab 4.

The cargo box 2 includes a front wall 14 (FIG. 2) which doubles as the rear wall of the cab, a rear wall 16, end walls 18 and 20, a floor 22, a ceiling 23 and a cover or lid 24. The ceiling 23 is formed integral at its forward edge 33 with a rear wall 7 of the cab 4. The ceiling 23 extends rearward (in FIG. 1) from the cab rear wall 7 in a horizontal plane, but may be sloped forward, rearward or to either side. The end walls 18 and 20 are formed integral and flush with the side frames 19 and 21 supporting the cab doors 25. The end walls 18 and 20 include a lower edge 27 which represents a rearward continuation of a lower edge of the frames 19 and 21 surrounding the doors 25. The end walls 18 and 20 include an upper edge 31 which extends rearward from the rear wall 7 of the cab 4 immediately below the rear cab window 5. The rear wall 16 is spaced by an air gap 71 from the front wall 8 of the bed 6. The cover 24 is hingeably mounted to the ceiling 23 via hinges (not shown). The cover 24 is securely closed via latch 28 which may include any conventionally known latch such as a combination lock, an internal key latch (such as in a door), or the type used with a padlock (as shown in FIG. 1). Recesses 29 afford a user handles to grasp the lid 24 when opening and closing.

Turning to FIG. 2, the front wall 14 of the cargo box 2 also represents the rear wall of the cab 4 and includes an access opening 30 which affords occupants of the pickup cab 4 access to the contents of the box 2 while the cover 24 remains closed. The access opening 30 is located below the rear window 5 of the cab. As shown in FIG. 2, the access opening 30 extends from the interior of the cargo box 2 through the rear wall of the cab 4. The access means 30 may be constructed in a variety of ways, so long as it affords an open passage between the cargo box and the cab.

Turning to FIG. 3, the access opening 30 receives a rectangular liner 34 mounted in the opening in the cargo box front wall 14 to protect users from injury and stored items from damage. The rectangular liner 34 is fixedly mounted to a rim 38 having a rectangular configuration. The opening 30 is located behind seats 11.

It is preferable to construct the cargo box 2 in such a manner that it maintains a sealed interior chamber 44 isolated from external environmental conditions. Along this line, a flange 50 is provided about the edge of the opening through the ceiling 23. The flange 50 includes a support ledge 52 which hingeably supports the lid 24. A seal 54 is provided upon the ledge 52 and extends about the opening. The seal 54 sealably engages the lid 24 when closed to prevent liquid and sound from entering the chamber 44 about the lid 24. As shown in FIG. 3, optionally, the cover 24 may include a beveled edge 64 about its perimeter to create shoulders which enhance the sealing relation with ceiling 23. In addition, the rear wall 16 may include an opening 70 therethrough in one corner thereof. The opening 70 may align with a similar opening 72 in the front wall 8 of the bed 6. The openings 70 and 72 may include peripheral support flanges 74 and 76, respectively, thereabout which support doors 78 and 80. A seal 82 may be provided about the flange 74 to sealably engage the door 78 when closed. Hinges 84 and 86 support the doors 78 and 80 to allow the doors to fold downward as shown in shadow in FIG. 3. A conventional latch may be used to secure the doors 78 and 80. When the doors 78 and 80 are open, the openings 70 and 72 align to allow longer items, such as lumber, to be slid across the gap 71 forward into the chamber 44 to provide additional bed space.

While not shown in detail, a variety of hinge types may be mounted in place of hinges to enable the desired movement to be provided between the cover 24 and ceiling 23.

While the preferred embodiment solely illustrates an uncovered access opening 30, a variety of closures may be utilized. For instance, the access means may be constructed with a single door or two side doors mounted upon hinges and arranged to pivotally open into the cab to opposite sides of the passage to provide fuller access to the contents of the interior. Optionally, the panels may be provided to close the opening 30 and arranged parallel to one another and may be slid to an overlapping position to afford access to the interior 44 of the cargo box 2. When the panels are slid to opposed positions, the panels close the opening 30, thereby sealing the cab from the cargo box. Preferably, adjoining inner edges of the panels include vertical seals which mate with one another when the panels are located at opposite ends of the tracks to maintain the seal. Each panel may include a handle to facilitate movement thereof between open and closed positions.

Optionally, a tire well may be formed in the cargo box to receive the tire in an upright (vertical) or a laid-down (horizontal) position. If the tire is to be received in a horizontal alignment, a tire well may be provided in the rear wall 16 of the box (and optionally in the front wall 8 of the bed 6) to afford room for the tire. If the tire is to be received in a vertical alignment, a tire well may be provided in the floor 22 of the box 2 to support the tire. Tire wells may be necessary if the box 2 is not sufficiently large to receive a tire otherwise.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A storage compartment integrally mounted to a cab of a pickup truck for storage of articles, said compartment being mounted immediately behind a rear wall of the cab, said compartment comprising:

a box section having front and back walls, a ceiling, a bottom wall, and side walls securely formed to one another and forming an interior cavity, said front wall corresponding to said rear wall of the cab and having an opening therethrough;

said side walls being formed integral with side walls of the cab and projecting rearward therefrom; and an opening through said ceiling which sealably receives a lid.

2. A storage compartment according to claim 1, wherein said back wall is spaced by an air gap from a front wall of a bed of said pickup truck.

3. A storage compartment according to claim 1, wherein said rear wall of said box and a front wall of a bed of said pickup truck include aligned openings therethrough and doors closing said openings.

4. A storage compartment according to claim 1, wherein a front surface of said front wall of said box represents an interior surface of the rear wall of the cab.

\* \* \* \* \*